(12) United States Patent
Oosaki et al.

(10) Patent No.: US 8,685,307 B2
(45) Date of Patent: Apr. 1, 2014

(54) METHOD FOR PRODUCING MULTILAYER ARTICLE

(75) Inventors: Nobuhiro Oosaki, Sodegaura (JP); Jinsho Nambu, Kamakura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 804 days.

(21) Appl. No.: 12/442,186

(22) PCT Filed: Sep. 28, 2007

(86) PCT No.: PCT/JP2007/069515
§ 371 (c)(1), (2), (4) Date: Apr. 1, 2009

(87) PCT Pub. No.: WO2008/038839
PCT Pub. Date: Apr. 3, 2008

(65) Prior Publication Data
US 2009/0283940 A1    Nov. 19, 2009

(30) Foreign Application Priority Data

Sep. 29, 2006  (JP) .................................. 2006-267178
Dec. 25, 2006  (JP) .................................. 2006-347304

(51) Int. Cl.
*B29C 51/10* (2006.01)
*B29C 51/14* (2006.01)

(52) U.S. Cl.
USPC ............ 264/308; 264/299; 264/556; 264/571

(58) Field of Classification Search
None
See application file for complete search history.

(56) References Cited

U.S. PATENT DOCUMENTS

| 5,221,566 | A | * | 6/1993 | Tokoh et al. ................. 428/34.5 |
| 5,574,096 | A |   | 11/1996 | Tanaka et al. |
| 5,766,751 | A | * | 6/1998 | Kotani et al. ................. 428/323 |
| 6,376,057 | B1 | * | 4/2002 | Akao et al. ................... 428/215 |

FOREIGN PATENT DOCUMENTS

| CA | 2021777 | | 1/1991 |
| CN | 1051009 | A | 5/1991 |
| CN | 1104654 | A | 7/1995 |
| CN | 1122117 | A | 5/1996 |
| JP | 8-41218 | A | 2/1996 |
| JP | 11-246729 | A | 9/1999 |
| JP | 11-31474 | A | 11/1999 |
| JP | 2000-326446 | A | 11/2000 |
| JP | 2003-285347 | A | 10/2003 |
| JP | 2004-18650 | A | 1/2004 |
| JP | 2005-59376 | A | 3/2005 |
| JP | 2005-169943 | A | 6/2005 |
| JP | 2006-167993 | A | 6/2006 |
| WO | 00/49072 | A1 | 8/2000 |

OTHER PUBLICATIONS

Third Office Action, dated Sep. 19, 2012 issued in the Chinese Patent Office, in corresponding Chinese Patent Application No. 200780036292.2, along with an English translation thereof.

* cited by examiner

*Primary Examiner* — Monica Huson
(74) *Attorney, Agent, or Firm* — Sughrue Mion, PLLC

(57) ABSTRACT

A method for producing a multilayer article is provided. The method comprises: a step of applying a first dispersion liquid comprising a first liquid medium and a first polymer component, a first alkali metal ion and a first inorganic laminar compound each dispersed in the first liquid medium to a surface of a support having a layer composed of a first thermoplastic resin to form a first dispersion liquid film on the support, wherein the first polymer component contains hydroxyl groups and carboxyl groups at a molar ratio, hydroxyl groups:carboxyl groups, of from 30:70 to 95:5; a step of removing the first liquid medium from the first dispersion liquid film to form a first coating film, thereby producing a layered article comprising the support and the first coating film; a step of heating the layered article at or above a temperature at which a condensation reaction between a hydroxyl group and a carboxyl group in the first coating film can occur, thereby hardening the coating film; and a step of supplying a second thermoplastic resin having been plasticized onto the layer of the first thermoplastic layer of the substrate of the layered article and shaping it into a specified shape, thereby producing a multilayer article having the layered article and a layer of the second thermoplastic resin.

18 Claims, No Drawings

METHOD FOR PRODUCING MULTILAYER ARTICLE

TECHNICAL FIELD

The present invention relates to methods for producing multilayer articles excellent in scratch resistance of their surfaces.

BACKGROUND ART

Articles made of thermoplastic resin are sometimes required to have surfaces with high scratch resistance. In order to protect the surface of an article, a protective sheet may be provided on the surface of the article. Such a protective sheet is required to be excellent in thermoformability and also in scratch resistance as a surface layer of an article. For example, JP 2000-326446 A discloses a decorative sheet as a product designed to be used as such a protective sheet, the decorative sheet comprising a thermoplastic sheet and a surface protective layer provided thereon wherein the surface protective layer is made of a ionizing radiation-curable resin.

In order to obtain an article having such a decorative sheet provided on the surface of a thermoplastic resin substrate, however, it is necessary to precisely control the compounding ratio of a hardening component in a composition to be used for the formation of a surface protective layer, mixing-dispersing conditions in the preparation of the composition, energy line irradiation conditions for curing the surface protective layer, etc.

DISCLOSURE OF THE INVENTION

The present invention provides simple and convenient methods for producing thermoplastic resin articles with good scratch resistance. That is, the present invention provides A method for producing a multilayer article; comprising:

a step of applying a first dispersion liquid comprising a first liquid medium and a first polymer component, a first alkali metal ion and a first inorganic laminar compound each dispersed in the first liquid medium to a surface of a support having a layer composed of a first thermoplastic resin to form a first dispersion liquid film on the support, wherein the first polymer component contains hydroxyl groups and carboxyl groups at a molar ratio, hydroxyl groups:carboxyl groups, of from 30:70 to 95:5;

a step of removing the first liquid medium from the first dispersion liquid film to form a first coating film, thereby producing a layered article comprising the support and the first coating film;

a step of heating the layered article at or above a temperature at which a condensation reaction between a hydroxyl group and a carboxyl group in the first coating film can occur, thereby hardening the coating film; and a step of supplying a second thermoplastic resin having been plasticized onto the layer of the first thermoplastic layer of the substrate of the layered article and shaping it into a specified shape, thereby producing a multilayer article having the layered article and a layer of the second thermoplastic resin.

One preferable embodiment of the above-mentioned method is a method in which the support is a multilayer support comprising the layer composed of the first thermoplastic resin and a second coating film formed on one side of the layer composed of the first thermoplastic resin, and wherein the method further comprises a step of preparing the multilayer support, this step comprising:

a step of applying a second dispersion liquid comprising a second liquid medium, a second polymer component and a second alkali metal ion each dispersed in the second liquid medium to a surface of the layer composed of the first thermoplastic resin to form a second dispersion liquid film on the layer composed of the first thermoplastic resin, wherein the second polymer component contains hydroxyl groups and carboxyl groups at a molar ratio, hydroxyl groups:carboxyl groups, of from 30:70 to 95:5; and a step of removing the second liquid medium from the second dispersion liquid film to form a second coating film, thereby producing the multilayer support.

In one preferable embodiment of such an improved method, the second dispersion liquid further comprises a second inorganic laminar compound, and the ratio of the volume of the first inorganic laminar compound to the total volume of the first polymer component and the first inorganic laminar compound to be added to the first liquid medium in the preparation of the first dispersion liquid is adjusted to be greater than the ratio of the volume of the second inorganic laminar compound to the total volume of the second polymer component and the second inorganic laminar compound to be added to the second liquid medium in the preparation of the second dispersion liquid.

MODE FOR CARRYING OUT THE INVENTION

In brief outline, the methods of the present invention contain the formation of a surface protective part which exhibits a surface protective function in a finally formed multilayer article and the formation of a so-called core part made of a thermoplastic resin. For the formation of a surface protective part is used a support having a layer composed of a thermoplastic resin. Such a support may be either a single layer support which is composed of only a layer made of a thermoplastic resin or a multilayer support in which on a layer of a thermoplastic layer is disposed a layer composed of another material. Such a support is usually in the form of sheet and it preferably is capable of being shaped into a three-dimensional form by thermoforming such as vacuum forming. In the layer made of a thermoplastic resin which is essential in a support, examples of the thermoplastic resin include olefin-based resins, such as polyethylene, ethylene-α-olefin copolymer, polypropylene, polybutene-1 and poly-4-methylpentene-1; ethylene-based copolymers, such as ethylene-vinyl acetate copolymer or its saponification product, ethylene-α, β-unsaturated carboxylic acid ester copolymer and ethylene-α,β-unsaturated carboxylic acid copolymer; polyester-based resins, such as polyethylene terephthalate, polybutylene terephthalate and polyethylene naphthalate; polyallylates; polycarbonates; acrylic resins, such as polymethyl methacrylate; styrene-based resins, such as polystyrene, AS resin and ABS resin; polyamide resins; chlorine-containing resins, such as polyvinyl chloride and polyvinylidene chloride; and fluorine-containing resins, such as polyvinyl fluoride, polyvinylidene fluoride, polytetrafluoroethylene, ethylene-tetrafluoroethylene copolymer and tetrafluoroethylene-perfluoroalkyl vinyl ether copolymer. In method of the present invention, a thermoplastic resin for forming a support and a thermoplastic resin for forming the core part of a multilayer article are used. The former and the latter may be distinguished from each other by being called "first thermoplastic resin" and "second thermoplastic resin", respectively.

As the first thermoplastic resin are preferable polyolefin-based resins, polyester resins, polycarbonate, acrylic resin, etc. In addition, the use of halogen-free resins, which are considered to give a reduced load to the environment, is also preferred.

In particular, polypropylenes are preferable as the polyolefin-based resin. Examples of the polypropylenes include homopolymers of propylene, and random copolymers and block copolymers of propylene and α-olefin. The random copolymers of propylene and α-olefin include propylene-α-olefin random copolymers prepared by copolymerizing propylene with an α-olefin having 2 to 20 carbon atoms except propylene, preferably at least one comonomer selected from among ethylene, butene-1,4-methyl-pentene-1, hexene-1 and octene-1.

Examples of the polyester resins include polyester-based resins prepared by condensation polymerization of an aromatic dicarboxylic acid, such as polyethylene terephthalate, with an aliphatic diol, and copolymerized polyester resins with thermoplastic elastomer-like properties having structural units resulting from condensation polymerization of an aliphatic or alicyclic dicarboxylic acid with a polyether-based diol.

Examples of the acrylic resins include polymethyl methacrylate and thermoplastic resins obtained by homopolymerizing or copolymerizing acrylonitrile, methacrylonitrile, acrylic acid, methacrylic acid, methacrylic acid, or acrylic acid derivatives such as acrylic ester.

The layer composed of the first thermoplastic resin in the support may be composed of two or more thermoplastic resins, and may contain additives for resins, such as antioxidants, UV absorbers, light stabilizers, lubricants, antiblocking agents, waxes, petroleum resins, antistatic agents and inorganic fillers. In the layer composed of a thermoplastic resin, modifiers such as ethylene-propylene copolymer rubber, ethylene-propylene-nonconjugated diene copolymer rubber, and styrene-based rubber, may be contained.

While the thickness of the layer composed of the first thermoplastic resin in the support may be determined in view of the thermoformability of a layered article produced by the use of this support and the design of a multilayer article finally obtained, it is ordinarily within a range of from 0.1 to 2.0 mm.

The layer composed of the first thermoplastic resin in the support may have either a monolayer structure or a multilayer structure having two or more layers. In particular, from the viewpoint of effective development of the thermoformability of a layered article to be prepared by the use of the support and the surface properties, such as scratch resistance, luster and deepness, of a multilayer article, which is a final product, a multilayer structure is preferred.

In the case of using a support having a thermoplastic resin layer with a multilayer structure, it is preferable to use, for forming a layer located on the side where a coating film, described below, is to be formed, a thermoplastic resin excellent in hardness, glossiness, deepness, etc. and to use, for forming a layer located on the side where a thermoplastic resin core part of a multilayer article is to be formed, a thermoplastic resin with good thermoformability or good adhesiveness to a thermoplastic resin which is to form the core part. From such points of view, a multilayer structure composed of polypropylene is preferable.

The layer composed of the first thermoplastic resin in the support may be provided with print, such as decals and patterns, on the surface located on the side where a coating film, mentioned below, is to be formed or may be caused to contain lusters, such as mica coated with aluminum or titanium oxide. The thermoplastic resin layer having multilayer structure in the support can be formed by, for example, extrusion lamination method or dry lamination method.

The method of the present invention has a step of applying a dispersion liquid containing a liquid medium, a polymer component, an alkali metal ion and an inorganic filler each dispersed in the liquid medium to a surface of the support to form a dispersion liquid film on the support, and a step of removing the liquid medium from the dispersion liquid film to form a coating film, thereby forming a layered article composed of the support and the coating film. The polymer component contains hydroxyl groups and carboxyl groups at a molar ratio, hydroxyl groups:carboxyl groups, of from 30:70 to 95:5.

In order to distinguish from the operation for producing a multilayer support mentioned below, the liquid medium, the polymer component, the alkali metal ion, the inorganic laminar compound, the dispersion liquid, the dispersion liquid film and the coating film may be specified as the first liquid medium, the first polymer component, the first alkali metal ion, the first inorganic laminar compound, the first dispersion liquid, the first dispersion liquid film and the first coating film, respectively.

In the method of the present invention, a multilayer support comprising a layer composed of a first thermoplastic resin and a coating film formed on one side of the layer composed of the thermoplastic resin can be used as the aforementioned support. Such a multilayer support can be formed by executing a step of applying a dispersion liquid comprising a liquid medium, a polymer component and an alkali metal ion each dispersed in the liquid medium to a surface of the layer composed of the first thermoplastic resin to form a dispersion liquid film on the layer composed of the thermoplastic resin, wherein the polymer component contains hydroxyl groups and carboxyl groups at a molar ratio, hydroxyl groups:carboxyl groups, of from 30:70 to 95:5; and a step of removing the liquid medium from the dispersion liquid film to form a coating film, thereby producing a multilayer support composed of the aforementioned thermoplastic resin and the coating film. The dispersion liquid is allowed to further contain an inorganic laminar compound.

In order to distinguish from the aforementioned operation for producing the first coating film on the support, the liquid medium, the polymer component, the alkali metal ion, the inorganic laminar compound, the dispersion liquid, the dispersion liquid film and the coating film in the aforementioned preparation of the multilayer support may be specified as the second liquid medium, the second polymer component, the second alkali metal ion, the second inorganic laminar compound, the second dispersion liquid, the second dispersion liquid film and the second coating film, respectively. The first polymer component and the second polymer component each having hydroxyl groups and carboxyl groups each may be either a polymer component (A1) having hydroxyl groups and carboxyl groups in one molecule or a polymer component which is a mixture of a polymer component (A2) having hydroxyl groups but having no carboxyl groups and a polymer component (A3) having carboxyl groups but having no hydroxyl groups. Examples of the polymer component (A1) having hydroxyl groups and carboxyl groups in one molecule include vinyl alcohol-acrylic acid copolymer and vinyl alcohol-methacrylic acid copolymer. Examples of the polymer component (A2) having hydroxyl groups but having no carboxyl groups include polyvinyl alcohol, partially saponified polyvinyl alcohol and polysaccharides. Examples of the polymer component (A3) having carboxyl groups but having no hydroxyl groups include polyacrylic acid, polymethacrylic acid, partially neutralized polyacrylic acid and partially neutralized polymethacrylic acid. Here, the term "hydroxyl group" means a so-called "alcoholic hydroxyl group" and does not include a hydroxyl group in a carboxyl group.

The polymer component (A2) having hydroxyl groups but having no carboxyl groups most preferably contains a polyvinyl alcohol-based polymer from the viewpoint of the solubility in an aqueous solvent and the scratch resistance of a multilayer article to be obtained. The "polyvinyl alcohol-based polymer" refers to a polymer having mainly vinyl alcohol units as constituent units. Examples of such a "polyvinyl alcohol-based polymer" include polymers obtained by hydrolyzing all or part of the acetate ester moieties of a vinyl acetate polymer or a vinyl acetate-α-olefin copolymer, and polymers obtained by hydrolyzing a vinyl trifluoroaceticate polymer, vinyl formate polymer, vinyl pivalate polymer, tert-butyl vinyl ether polymer, trimethylsilyl vinyl ether polymer, etc. The content of the vinyl alcohol units of the polyvinyl alcohol-based polymer usually is more than 50 mol %, preferably is 60 mol % or more, and more preferably is 85 mol % or more. Examples of the α-olefin include ethylene and propylene, and the content thereof preferably is 40 mol % or less, and more preferably is 15 mol % or less. The degree of saponification of the ester moieties of a polymer preferably is not less than 70 mol %, more preferably is not less than 85 mol %, and even more preferably is not less than 98 mol %. Polymers having a degree of saponification of 98 mol % or more are called "perfectly saponified polymers." The degree of polymerization of the polyvinyl alcohol-based polymer to be used preferably is from 100 to 5,000, and more preferably is from 1,000 to 2,000.

A polymer additionally having functional groups other than hydroxyl groups called a "polyvinyl alcohol derivative" can also be used as the polyvinyl alcohol polymer. Examples of such functional groups include amino group, thiol group, carboxyl group, sulfone group, phosphate group, carboxylate group, sulfonic acid ion group, phosphate anion group, ammonium group, phosphonium group, silyl group, siloxane group, alkyl group, allyl group, fluoroalkyl group, alkoxy group, carbonyl group and halogen group. Some hydroxyl groups in a polyvinyl alcohol may have been replaced by one kind or two or more kinds of such functional groups.

The polymer component (A2) having hydroxyl groups but having no carboxyl groups preferably contains, in addition to a polyvinyl alcohol-based polymer, a compound (E) having in the molecule two or more continuous carbon atoms each having at least one hydroxyl group attached thereto.

From the viewpoint of solubility in water, the compound (E) preferably is a chain polyhydric alcohol represented by formula $C_nH_{2(n+1)}O_n$. Examples of the chain polyhydric alcohol include sorbitol, mannitol, dulcitol, xylitol, erythritol and glycerol. Moreover, multimers of such alcohols are also applicable as the compound (E). Furthermore, two or more compounds may be used together as the compound (E).

From the viewpoint of the thermoformability of a layered article composed of a support and a first coating film and the scratch resistance of a multilayer article to be obtained finally, monoglycerol and polyglycerol are preferable as the compound (E), and polyglycerol is more preferable. The polyglycerol preferably is from trimer to 50-mer, more preferably is from pentamer to 40-mer, and most preferably is from heptamer to 30-mer.

From the viewpoint of the shapability of a layered article, the amount of the compound (E) contained in the first coating film preferably is from 9 to 60%, more preferably is from 20 to 55%, even more preferably from 29 to 55%, and most preferably from 38 to 52% of the whole weight of the first polymer component.

The polymer component (A3) having carboxyl groups but having no hydroxyl groups preferably is at least one resin component selected from the group consisting of polyacrylic acid, polymethacrylic acid, partially neutralized polyacrylic acid and partially neutralized polymethacrylic acid. While a copolymer of acrylic acid and methacrylic acid can be used, polyacrylic acid-based polymers, such as polyacrylic acid and partially neutralized polyacrylic acids, are preferable.

The weight average molecular weight of the polymer component (A3) having carboxyl groups but having no hydroxyl groups preferably is within a range of from 2,000 to 5,000, 000, more preferably is within a range of from 100,000 to 5,000,000, and even more preferably is within a range of from 500,000 to 5,000,000.

Partially neutralized polyacrylic acids can be obtained generally by adding an alkali component such as sodium hydroxide to an aqueous solution of polyacrylic acid. It is possible to obtain a desired degree of neutralization by adjusting the ratio of the amount of polyacrylic acid to the amount of alkali. It is also possible to convert a perfectly neutralized polyacrylic acid into a partially neutralized product by ion exchange. Partially neutralized polymethacrylic acids can also be obtained similarly from polymethacrylic acid. The partially neutralized polyacrylic acid and partially neutralized polymethacrylic acid preferably have a degree of neutralization, as calculated from the following formula, of from 0.1% to 20%.

$$\text{Degree of neutralization} = (A/B) \times 100$$

A: The molar number of the neutralized carboxyl groups contained in one gram of polyacrylic acid or polymethacrylic acid.

B: The molar number of the carboxyl groups contained in one gram of polyacrylic acid or polymethacrylic acid before the neutralization.

The molar ratio of the hydroxyl groups to the carboxyl groups contained in the first polymer component and the molar ratio of the hydroxyl groups to the carboxyl groups contained in the second polymer component are each within a range of hydroxyl groups:carboxyl groups=30:70 to 95:5, and preferably within a range of 70:30 to 95:5. In order to produce a multilayer article having better scratch resistance, the combined weight of the hydroxyl groups and the carboxyl groups contained in the first polymer component preferably is from 30 to 60%, and more preferably is from 35 to 55% of the weight of the polymer component.

The molar ratio of the hydroxyl groups to the carboxyl groups contained in the first polymer component and the molar ratio of the hydroxyl groups to the carboxyl groups contained in the second polymer component each can be determined by the NMR method, the IR method, etc. which are known in the art. In, for example, the IR method, the ratio can be calculated from a working curve produced by using samples whose molar ratio of the hydroxyl groups to the carboxyl groups has been known. In the event that a vinyl alcohol homopolymer and an acrylic acid homopolymer and/or a methacrylic acid homopolymer are used, it is possible to determine the molar numbers of the hydroxyl groups and the carboxyl groups from the weights of these polymers in advance and then calculate the molar ratio. Like the molar ratio, the combined weight of the hydroxyl groups and the carboxyl groups contained in the polymer component can be determined by a technology known in the art, for example, the NMR method and the IR method. In, for example, the IR method, working curves are produced by using polyol polymers each having a known number of polyol units and polycarboxylic acids each having a known number of polycarboxylic acid units, and then the combined weight of the hydroxyl groups and the carboxyl groups can be calculated. In the event that a vinyl alcohol homopolymer and an acrylic acid homopolymer and/or a methacrylic acid homopolymer are used, it is possible to determine the weights of the hydroxyl groups and the carboxyl groups from the weights of these polymers and then use the sum total of the weights.

It is preferable that the first polymer component and the second polymer component each be a mixture of 95 to 5% by weight of a polyvinyl alcohol-based polymer and 5 to 95% by weight of a polyacrylic acid-based polymer.

Furthermore, the polymer component (A3) containing carboxyl groups but containing no hydroxyl groups preferably contains, in addition to a polyacrylic acid-based polymer, a compound (F) having in the molecule two or more continuous carbon atoms each having at least one carboxyl group attached thereto.

The compound (F) may be a compound having one or more anhydride structure formed between two carboxyl groups. The compound (F) may be any one of a macromolecule, an oligomer, and a low molecular weight compound. Such a macromolecule and an oligomer include polymaleic acid, polymaleic anhydride, and copolymers thereof, such as an alternating copolymer of maleic acid (or maleic anhydride) and acrylic acid. Preferred are oligomers having a number average molecular weight of less than 10,000.

Low molecular weight compounds are used more preferably. Examples of such a compound include 1,2,3-propanetricarboxylic acid, 1,2,3,4-butanetetracarboxylic acid, citric acid, 1,2,3-benzenetricarboxylic acid, 3-butene-1,2,3-tricarboxylic acid, butane-1,2,3,4-tetracarboxylic acid, 1,2,3,4-cyclopentanetetracarboxylic acid, tetrahydrofuran-2,3,4,5-tetracarboxylic acid, benzenepentacarboxylic acid, benzenehexacarboxylic acid, 1,2,3,4,5,6-cyclohexanehexacarboxylic acid, benzenehexacarboxylic acid, and anhydrides of these compounds. From the viewpoint of the thermoformability of a layered article composed of the support and the first coating film and the scratch resistance of a multilayer article finally obtained, the compound (F) preferably is 1,2,3,4-butanetetracarboxylic acid.

From the viewpoint of the shapability of a layered article, the amount of the compound (F) contained in the first coating film preferably is from 9 to 60%, more preferably is from 20 to 55%, even more preferably from 29 to 55%, and most preferably from 38 to 52% of the whole weight of the first polymer component.

The first polymer component contained in the first dispersion liquid and the second polymer component contained in the second dispersion liquid may be either the same or different from each other.

The first inorganic laminar compound contained in the first dispersion liquid and the second inorganic laminar compound which may be contained in the second dispersion liquid are materials that have, in a state where they are still raw material before being added to a liquid medium, a layered structure composed of unit crystal layers piled one on another. The layered structure is a structure composed of planes in which atoms are bonded together strongly and arranged densely due to covalent bonding are piled on one on another under a weak bonding force, such as van der Waals' force.

The first inorganic laminar compound and the second inorganic laminar compound exist in a cleaved state in the first coating film and the second coating film in a layered article, respectively. Examples of the first and the second inorganic laminar compounds include graphite, zirconium phosphate-based compounds, chalcogenides, hydrotalcite compounds, lithium aluminum complex hydroxides, and clay minerals.

The "chalcogenides" referred to herein include dichalcogenides of elements of Group IV (Ti, Zr, Hf), Group V (V, Nb, Ta), and/or Group VI (Mo, W) and are represented by a formula $MX_2$, wherein M denotes an element listed above and X denotes a chalcogen (S, Se, Te). From the viewpoint of dispersibility, inorganic laminar compounds having a property of swelling and cleaving in a solvent as described below are preferable, and clay minerals having a property of swelling and cleaving in a solvent are particularly preferable.

The degree of the property that an inorganic laminar compound swells and cleaves in a solvent can be evaluated by the tests provided below. The swellability of an inorganic laminar compound preferably is 5 or more, and more preferably is 20 or more, as determined by the swellability test described below. On the other hand, the cleavability of an inorganic laminar compound preferably is 5 or more, and more preferably is 20 or more, as determined by the cleavability test described below.

Examples of the solvent in which an inorganic laminar compound is swollen and cleaved include water, alcohols (methanol, ethanol, propanol, isopropanol, ethylene glycol, diethylene glycol, etc.), dimethylformamide, dimethyl sulfoxide, and acetone when the inorganic laminar compound is a hydrophilic, swellable clay mineral; and water, alcohols and water-alcohol mixtures are particularly preferable.

When the inorganic laminar compound is an organically modified clay mineral, aromatic hydrocarbons, such as benzene, toluene and xylene, ethers, such as ethyl ether and tetrahydrofuran, ketones, such as acetone, methyl ethyl ketone and methyl isobutyl ketone; aliphatic hydrocarbons, such as n-pentane, n-hexane and n-octane; halogenated hydrocarbons, such as chlorobenzene, carbon tetrachloride, chloroform, dichloromethane, 1,2-dichloroethane and perchlorethylene; ethyl acetate, methyl methacrylate, dioctyl phthalate, dimethylformamide, dimethyl sulfoxide, methyl cellosolve, silicone oil, etc. can use as a liquid medium.

[Swellability Test]

In a 100-ml graduated cylinder is placed 100 ml of liquid medium, and 2 g of inorganic laminar compound is added slowly thereto. After leaving at rest at 23° C. for 24 hours, the volume of an inorganic laminar compound dispersion layer is read from a graduation line at the interface between the inorganic laminar compound dispersion layer and the supernatant in the graduated cylinder. The larger the value (swell value), the higher the swellability.

[Cleavability Test]

Thirty grams of an inorganic laminar compound is added slowly to 1,500 mL of a solvent, and is dispersed by means of a disperser (DESPA MH-L manufactured by Asada Iron Works Co., Ltd., vane diameter=52 mm, rotating speed=3, 100 rpm, container capacity=3 L, distance between the bottom face and the vane=28 mm) at a peripheral speed of 8.5 m/min, at 23° C. for 90 minutes. Then, 100 mL of a resulting dispersion liquid is taken into a graduated cylinder. After being left at rest for 60 minutes, the volume (ml) of an inorganic laminar compound dispersion layer is read from a graduation line at the interface between the inorganic laminar compound dispersion layer and the supernatant. The larger the value (cleavage value), the higher the cleavability.

The aspect ratio of the inorganic laminar compound preferably is from 30 to 3,000, and more preferably is from 30 to 1,500. If the aspect ratio is excessively large, the dispersibility will be impaired, and therefore a resulting multilayer article tends to be insufficient in scratch resistance.

In the present invention, the aspect ratio (Z) of a clay mineral is defined by a formula $Z=L/a$. In the formula, L is an average particle diameter of the clay mineral, and "a" represents the unit thickness of the clay mineral, that is, the unit crystal layer of the clay mineral.

The "a", which is the unit thickness of a viscosity mineral, can be determined by the powder X-ray diffraction method. The powder X-rays reflection of a clay mineral having a layered structure is divided into bottom reflection and non-bottom reflection, and the bottom reflection reflects the atomic arrangement perpendicular to layer planes. The spacing of the reflection having the largest d value, calculated from the Bragg's equation (2d sin θ=λ), among a series of bottom reflections represents the basal spacing, which is used in the present invention as the unit thickness "a" of the clay mineral.

In the present invention, the average particle diameter L of an inorganic laminar compound is a particle diameter (median diameter on volume basis) determined by the diffraction/scattering method conducted in a solvent. That is, the average particle diameter L can be determined through a calculation, using the Mie scattering theory or the like, of a particle size distribution from a diffraction/scattering pattern produced by passing a beam of light through a dispersion liquid of the inorganic laminar compound. Specifically, the average particle diameter can be determined by dividing the measuring range of the particle size distribution into proper sections and determining a representative particle diameter for each of the sections, thereby converting the particle size distribution, which is continuous by nature, into discrete quantities. When the inorganic laminar compound is swollen and cleaved fully in a solvent of the same type as that of the solvent used for the determination of the average particle diameter of the inorganic laminar compound by the diffraction/scattering method and then is mixed with the first polymer component, the particle diameter of the inorganic laminar compound in the polymer component is equal to the particle diameter of the inorganic laminar compound measured in the solvent.

While the amount of the first inorganic laminar compound contained in the first dispersion liquid is not limited, it is preferable, from the viewpoint of the thermoformability of a layered article composed of the support and the first coating film and the scratch resistance of a multilayer article to be obtained finally, that the volume ratio of the first polymer component to the first inorganic laminar compound be from 50/50 to 99/1, more preferably from 70/30 to 99/1.

When the second dispersion liquid contains a second inorganic laminar compound, while the amount of the second inorganic laminar compound contained in the second dispersion liquid is not limited, it is preferable, from the viewpoint of the thermoformability of a layered article composed of the support and the first coating film and the scratch resistance of a multilayer article to be obtained finally, that the volume ratio of the second polymer component to the second inorganic laminar compound be from 100/0 to 95/5, more preferably from 100/0 to 97/3.

The first inorganic laminar compound and the second inorganic laminar compound may be the same or different from each other.

It is preferable that the ratio of the volume of the first inorganic laminar compound to the total volume of the first polymer component and the first inorganic laminar compound to be added to the first liquid medium in the preparation of the first dispersion liquid be adjusted to be greater than the ratio of the volume of the second inorganic laminar compound to the total volume of the second polymer component and the second inorganic laminar compound to be added to the second liquid medium in the preparation of the second dispersion liquid.

Examples of the first alkali metal ion and the second alkali metal ion include sodium ion, lithium ion and potassium ion. While neither the weight of the first alkali metal ion contained in the first coating film nor the weight of the second alkali metal ion contained in the second coating film is limited, they are preferably from 0.2 to 5%, and more preferably from 0.2 to 2% relative to the weight of the polymer component contained in each coating film.

The first alkali metal ion and the second alkali metal ion each originate in an alkali metal ion-donating compound. That is, alkali metal ion donating compounds are used for the preparations of the first dispersion liquid and the second dispersion liquid. Examples of such alkali metal ion-donating compounds include sodium hydroxide, sodium hypophosphite, lithium hydroxide, potassium hydroxide and clay minerals containing alkali metal ion. Two or more kinds of alkali metal ion-donating compounds may be used together.

Clay minerals are typically laminar compounds. Examples of clay minerals applicable to the present invention include montmorillonite, beidellite, nontronite, saponite, sauconite, stevensite, hectorite, tetrasilylic mica, sodium taeniolite, muscovite and phlogopite. Materials, which may sometimes be called "organically modified clay minerals," obtained by subjecting clay minerals such as those mentioned above to treatment like ion exchange with an organic substance also may be used as the alkali metal ion-containing clay minerals. As the organic substance for treating clay minerals, quaternary ammonium salts such as dimethyldistearyl ammonium salt and trimethylstearyl ammonium salt, phosphonium salts, imidazolium salts, etc. may be used.

In the step of heating a layered article composed of a support and a first coating film, it is preferable, from the viewpoint of promoting the thermal reaction of the coating film to increase the scratch resistance, that the alkali metal ion be sodium ion and the sodium ion-donating compound be a sodium ion-containing clay mineral from. Particularly, montmorillonite is preferably used.

An inorganic laminar compound having an alkali metal ion between layers can serve as an alkali metal ion-donating compound. Such a compound releases an alkali metal ion in a liquid medium and, at the same time, gives an inorganic laminar compound containing no alkali metal ion or an inorganic laminar compound reduced in alkali metal ion content. In the event that a partially neutralized polyacrylic acid obtained by adding sodium hydroxide to an aqueous solution of polyacrylic acid is used as the first polymer component or the second polymer component, the partially neutralized polyacrylic acid can serve as an alkali metal ion-donating compound.

To the first dispersion liquid and the second dispersion liquid may be added additives, e.g., conventional additives such as antioxidants, UV absorbers, light stabilizers, antiblocking agents, and colorants, according to the purpose or the application. Such additives may be used singly or in combination of two or more of them.

When a multilayer support composed of a layer of a first thermoplastic resin and a second coating film is used as a support and a first coating film is formed on the surface of the second coating film, the thickness of the first coating film and the thickness of the second coating film generally are each within a range of from 0.1 to 5.0 μm from the viewpoint of the thermoformability of a layered article composed of the support and the first coating film and the scratch resistance of a multilayer article to be obtained finally. The thickness of the first coating film preferably is less than the thickness of the second coating film.

In order to improve the adhesiveness between the first coating film and the support and the adhesiveness between the second coating film and the layer of the first thermoplastic resin, it is preferable to apply surface treatment to the support or the layer of the first thermoplastic resin. Examples of the surface treatment include corona treatment, ozone treatment, plasma treatment, electron beam radiation treatment, acid treatment, anchor coating treatment, and primer treatment. Such methods may be used singly or in combination of two or more of them. Such surface treatment methods are effective also as a surface treatment method executed when print, such as decals and patterns, is provided on the surface of the layer of the first thermoplastic resin. Examples of the method for preparing the first dispersion liquid include a method which comprises dissolving or dispersing a first polymer component, an alkali metal ion-donating compound and an inorganic laminar compound separately in a liquid medium and then mixing these liquids together, and a method which comprises dissolving or dispersing a first polymer component, a first inorganic laminar compound and an alkali metal ion-donating compound in the same liquid medium. When the first polymer component is a mixture of a polymer component (A2) having hydroxyl groups and a polymer component (A3) having carboxyl groups, the polymer component (A2) and the polymer component (A3) may be dissolved or dispersed individually in separate liquid media or, alternatively, in the same liquid medium.

The second dispersion liquid can be prepared in the same manner as that in the preparation method of the first dispersion liquid except for adding no inorganic laminar compound because the second dispersion liquid is the same as the first dispersion liquid except that an inorganic laminar compound is not an essential component.

When a dispersion liquid is prepared using an inorganic laminar compound which can swell and cleave in a liquid medium, it is preferable to disperse the inorganic laminar compound in a medium by high pressure dispersion treatment in order to swell and cleave the inorganic laminar compound fully in the medium. The high pressure dispersion treatment used herein is a treatment method comprising forcing a liquid mixture composed of an inorganic laminar compound and a solvent to pass through capillary tubes at high speed and then combining flows, thereby causing the flows to collide with each other or against the inner walls of the capillary tubes to add high shear and/or high pressure. In the high pressure dispersion treatment, it is desirable to cause the mixture liquid to pass through capillary tubes with a diameter of about 1 µm to about 1 mm so that a maximum pressure of 100 kgf/cm$^2$ or more can be applied to the mixture liquid. The maximum pressure more preferably is 500 kgf/cm$^2$ or more, and particularly preferably is 1,000 kgf/cm$^2$ or more. The maximum speed of the mixture liquid at which the mixture liquid arrives during it passes through the capillary tubes preferably is 100 m/sec or more, and the rate of heat transfer due to pressure loss preferably is 100 kcal/hr or more. The high pressure dispersion process can be conducted by use of a high pressure dispersing apparatus, such as an ultrahigh pressure homogeniser manufactured by Microfluidics Corporation (commercial name: MICROFLUIDIZER), NANOMIZER manufactured by Nanomizer Inc., a Manton Gaulin type high pressure dispersing device, and Homogenizer manufactured by Izumi Food Machinery Co., Ltd. The liquid which is subjected to the high pressure dispersion treatment may contain a polymer component.

It is preferable to add a surfactant to the first dispersion liquid or the second dispersion liquid. The application of a dispersion liquid containing a surfactant can improve the adhesiveness of a coating film to be formed. The content of the surfactant in the dispersion liquid generally is from 0.001 to 5% by weight. If the added amount of the surfactant is excessively small, the effect of improving the adhesiveness will be insufficient. On the other hand, if the added amount of the surfactant is excessively large, the scratch resistance may be reduced.

As the surfactant, conventional surfactants such as anionic surfactants, cationic surfactants, zwitterionic surfactants and nonionic surfactants may be used. In particular, it is desirable, from the viewpoint of improvement in adhesion, to use alkali metal salts of carboxylic acids with an alkyl chain having from 6 to 24 carbon atoms, ether type nonionic surfactants (silicone-based nonionic surfactants) such as polydimethylsiloxane-polyoxyethylene copolymers, or fluorine type nonionic surfactants (fluorine-containing nonionic surfactants) such as perfluoroalkyl ethylene oxide compounds.

Examples of the method for applying the dispersion liquid include gravure methods such as the direct gravure method and the reverse gravure method, roll coating methods such as the double roll beat coating method, the bottom-feed triple reverse coating method, the doctor knife method, the die coating method, the bar coating method, the dipping method, and the spray coating method. The use of a gravure method is preferred because a layer which is uniform in thickness can be formed.

Following the application of the dispersion liquid (the first dispersion liquid or the second dispersion liquid), a coating film is formed by removing the liquid medium from the dispersion liquid. The removal of the liquid medium can be executed by heating under normal pressure or reduced pressure.

The support may have been shaped into a desired three-dimensional form before the application of the first dispersion liquid for forming the first coating film, or alternatively the layer composed of the first thermoplastic resin may have been shaped into a desired three-dimensional form before the application of the second dispersion liquid for forming the second coating film.

After the production of a layered article by forming the first coating film on the support, a step of heating the layered article at or above a temperature at which a condensation reaction between a hydroxyl group and a carboxyl group in the first coating film occurs is carried out. In the layered article, in which the hydroxyl groups and the carboxyl groups contained in the coating film have reacted little before the heating, hydroxyl groups and carboxyl groups react together in the step of heating, so that the surface hardness will increase. As a result of the execution of this step, a finally obtained multilayer article comes to have excellent scratch resistance. The pencil hardness of the surface of an article after the heating step and the surface of a final multilayer article preferably is 2B or more. In the event that the aforementioned multilayer support composed of a layer made of the first thermoplastic resin and the second coating film is used in the heating step, it is preferable to heat it at or above a temperature at which a condensation reaction between a hydroxyl group and a carboxyl group occurs also in the second coating film.

Moreover, during the heating step or after the completion of the heating step, the heated layered article may be shaped into a three-dimensional form.

When the first thermoplastic resin in the support is a crystalline thermoplastic resin, it is preferable to hold the temperature of the layered article at 100 to 180° C. for 1 to 60 seconds and then shape the layered article while the temperature of the layered article is within the range of from (the melting point of the thermoplastic resin−30° C.) to (the melting point of the thermoplastic resin+30° C.) in the heating step. The crystalline thermoplastic resin referred to herein is a thermoplastic resin having a glass transition temperature and a melting point. The glass transition temperature and the melting point can be measured using a differential scanning calorimeter (DSC), etc.

When the first thermoplastic resin is a non-crystalline thermoplastic resin, it is preferable to hold the temperature of the layered article at 100 to 180° C. for 1 to 60 seconds and then shape the layered article while the temperature of the layered article is within the range of from (the glass transition temperature of the thermoplastic resin−30° C.) to (the glass transition temperature of the thermoplastic resin+30° C.) in the heating step. The non-crystalline thermoplastic resin referred to herein is a thermoplastic resin having only a glass transition temperature and having no melting point. The presence of the glass transition temperature and the melting point can be determined by the use of the aforementioned DSC, etc.

The step of shaping the heated layered article into a desired three-dimensional form preferably is a step of bringing the layered article into firm contact with a mold surface having the three-dimensional form by vacuum suction or a step of bringing the layered article into firm contact with a mold surface by blowing compressed air to the layered article, like vacuum forming, pressure forming, or vacuum-pressure forming.

The method for producing a multilayer article of the present invention contains a step of supplying a plasticized second thermoplastic resin onto the layer of the first thermoplastic resin of the support of the layered article and then shaping it into a desired form. By executing this step, it is possible to obtain a multilayer article, which is a final product, having the aforesaid layered article and a layer of the second thermoplastic resin. Specifically, the layered article is placed in a mold cavity so that the first coating film in the layered article can come into contact with the cavity surface of the mold. Then, by an injection molding method, an injection-compression molding method, an injection press molding method, etc., a plasticized second thermoplastic resin is supplied, and is shaped and joined to the layered article, followed by being cooled to solidify.

The multilayer article obtained by the method of the present invention is suitable for various applications where high scratch resistance is required, such as housing exterior components, housing interior materials, furniture components, automobile exterior components, automobile interior components, motorcycle exterior components, household electric appliance parts, sundry components, and signboards.

EXAMPLES

The invention is described in detail below with reference to Examples. First, methods for measuring physical properties and the like are described.

[Thickness Measurement]

Thicknesses of not less than 0.5 µm were measured by means of a commercially available digital-type thickness measuring device (contact-type thickness measuring device, trade name: Ultra-High Precision Deci-Micro Head MH-15M, mfd. by Nihon Kogaku K.K.). Thicknesses less than 0.5 µm were determined through cross-sectional observation with a transmission electron microscope (TEM).

[Measurement of Particle Size]

The particle size was measured using a laser diffraction/scattering particle size distribution analyzer (LA910, manufactured by HORIBA, Ltd.). The average particle diameters of the clay minerals in the coating liquids (1), (2) and (4) described infra were measured by the paste cell method at an optical path length of 50 µm. Further, the average particle diameters of the clay minerals in diluted liquids of the coating liquids (1), (2) and (4) were measured by the flow cell method at an optical path length of 4 mm. In both the measurements, the average particle diameters determined were the same. This fact shows that the clay mineral in the dispersion liquid was fully swollen and cleaved. The value obtained was considered as the average particle diameter L of the clay mineral in the resin composition forming a coating film.

[Measurement of the Number Ratio of the Hydroxyl Groups to the Carboxyl Groups Contained in Polymer Component]

A polyvinyl alcohol (perfectly saponified product) and a polyacrylic acid were used as the polymer component (A2) having hydroxyl groups and the polymer component (A3) having carboxyl groups, respectively. The number of the hydroxyl groups in the polyvinyl alcohol and the number of the carboxyl groups in the polyacrylic acid were calculated from the formulas given below and then their ratio was calculated.

The number of the hydroxyl groups=(Added amount of polymer component ($A2$))/(Molecular weight per monomer unit constituting polymer component ($A2$))

The number of the carboxyl groups=(Added amount of polymer component ($A3$))/(Molecular weight per monomer unit constituting polymer component ($A2$))

[Measurement of the Combined Weight of the Hydroxyl Groups and the Carboxyl Groups in Polymer Component (A)]

A polyvinyl alcohol (perfectly saponified product) and a polyacrylic acid were used as the polymer component (A2) having hydroxyl groups and the polymer component (A3) having carboxyl groups, respectively. The weight of hydroxyl groups and the weight of carboxyl groups were calculated by the formulas given below and they were summed.

The weight of the hydroxyl groups=(17/(molecular weight per monomer unit constituting polymer component ($A2$))×(added amount of polymer component ($A2$)/total added amount of polymer components)×100

The weight of the carboxyl groups=(45/(molecular weight per monomer unit constituting polymer component ($A3$))×(added amount of polymer component ($A3$)/total added amount of polymer components)×100

[Measurement of Alkali Metal Ion Concentration]

The sodium ion concentration of the entire layered article was measured using an inductively coupled plasma emission spectroscopy (Optima 3000, manufactured by Perkin Elmer Japan Co., Ltd.). Then, the sodium ion concentration in the resin composition forming a coating film was calculated by subtracting the sodium ion concentration in the layer or layers other than the layer of the resin composition from the sodium ion concentration of the entire layered article. The method for sample preparation is as follows. One-gram portions were sampled from the layered article and the support, respectively. To each sample, 1 ml of 96% sulfuric acid was added, followed by ashing in an electric furnace. The residue was dissolved in 5% hydrochloric acid and the volume of the solution was measured. The solution was placed in the inductively coupled plasma emission spectroscopy. Thus, the sodium ion concentrations the samples were measured and then their difference was calculated.

[Determination of Aspect Ratio]

The diffraction measurement of a clay mineral was conducted by the powder method using an X-ray diffraction apparatus (XD-5A, manufactured by Shimadzu Corporation.). Thus, the unit thickness "a" of the clay mineral was determined. Using an average particle diameter L measured by the method described above, the aspect ratio Z of the clay mineral was calculated from an equation Z=L/a. X-ray diffraction measurement conducted for materials obtained by drying the coating liquids (1), (2) or (4) confirmed that the interplanar spacing of the clay mineral had been enlarged.

[Thermoforming]

The resulting layered article was fixed in a heating zone using a vacuum forming machine, and then both sides of the layered article were heated at a preset temperature of 430° C. for 20 seconds using far-infrared heaters while the distance between each of the heaters and the layered article was kept at 125 mm. Then, the layered article was brought into contact with a mold and the air between the mold and the layered article was evacuated, so that the layered article was shaped. Following solidification by cooling with a blower, the shaped layered article was taken out.

[Evaluation of Shapability]

The shape of the shaped layered article was visually observed and the degree of difference from the shape of the mold used for the vacuum forming was evaluated in accordance with the following criteria.

○: A layered article shaped in conformity with the shape of the mold was obtained.

x: No layered article shaped in conformity with the shape of the mold was obtained.

[Pencil Hardness]

The scratch resistance of a shaped layered article was evaluated in accordance with the pencil scratching test method provided in JIS K-5400. A test was conducted at first with a pencil of 6B hardness, and then the hardness was increased successively as 5B, 4B . . . . The pencil hardness was expressed by the maximum hardness of the pencils which produced no scratches on the surface.

[Preparation of Coating Liquid (Dispersion Liquid)]

Preparation of Coating Liquid (1)

In a dispersion pot (trade name: DESPA MH-L, manufactured by ASADA Iron Works, Co., Ltd.), 1,300 g of ion exchange water (specific conductivity: 0.7 μs/cm or less) and 130 g of polyvinyl alcohol (PVA 117H, manufactured by Kuraray Co., Ltd., degree of saponification: 99.6%, degree of polymerization: 1,700) were mixed together and heated up to 95° C. under slow stirring (1,500 rpm, peripheral speed: 4.1 m/min). After stirring the mixture at that temperature for 30 minutes to dissolve the polyvinyl alcohol, the mixture was cooled to 60° C. to yield an aqueous polyvinyl alcohol solution. While the aqueous polyvinyl alcohol solution (60° C.) was stirred under conditions the same those mentioned above, an aqueous alcohol solution prepared by mixing 122 g of 1-butanol, 122 g of isopropyl alcohol and 520 g of ion exchange water was dropped over 5 minutes. After the dropping, the stirring mode was switched to high-speed stirring (3,000 rpm, peripheral speed: 8.2 m/min) and then 36 g of high purity montmorillonite (trade name: Kunipia G, manufactured by Kunimine Industries Co., Ltd.) was added slowly. After the addition, stirring was continued at 60° C. for 60 minutes. Then, 243 g of isopropanol was further added over 15 minutes, followed by cooling of the mixture to room temperature. Thus, a liquid containing clay mineral was obtained.

To the liquid containing clay mineral, 0.1% by weight, based on the weight of the dispersion liquid, of a nonionic surfactant (polydimethylsiloxane-polyoxyethylene copolymer, trade name: SH3746, manufactured by Dow Corning Toray Co., Ltd.) was added under slow-speed stirring (1,500 rpm, peripheral speed: 4.1 m/min). Then, the mixture was conditioned to pH 6 by means of ion exchange resin. Thus, a clay mineral dispersion liquid was prepared.

In another dispersion pot (trade name: DESPA MH-L, manufactured by ASADA Iron Works, Co., Ltd.), 1,067 g of ion exchange water (specific conductivity: 0.7 μs/cm or less) and 33 g of poly(acrylic acid) (manufactured by Wako Pure Chemical Industries, Ltd., average molecular weight: 1,000,000) were mixed together and stirred at low speed (1,500 rpm, peripheral speed: 4.1 m/min) at room temperature. Thus, a solution of polymer component (A3) was produced.

A mixture liquid was prepared by mixing 2,519 g of the clay mineral dispersion liquid and 1,100 g of the solution of polymer component (A3) slowly under low-speed stirring (1,500 rpm, peripheral speed: 4.1 m/min). The mixture liquid was treated under a pressure of 1,100 kgf/cm$^2$ using a high pressure dispersion instrument (commercial name: Ultra-high-Pressure Homogenizer M110-E/H, manufactured by Microfluidics Corporation), giving a coating liquid (1).

The montmorillonite cleaved in the coating liquid (1) had an average particle diameter L of 560 nm, a unit thickness "a", determined by powder X-ray diffraction, of 1.2156 nm, and an aspect ratio Z of 460.

Preparation of Coating Liquid (2)

A coating liquid (2) was obtained in the same manner as that in the preparation of the coating liquid (1), except for using a polyvinyl alcohol (AQ2117, produced by Kuraray Co., Ltd., degree of saponification=99.6%, degree of polymerization=1,700) instead of the polyvinyl alcohol (PVA117H) used in the preparation of the coating liquid (1) and using 80 g of high purity montmorillonite.

Preparation of Coating Liquid (3)

A coating liquid (3) was obtained in the same manner as that in the preparation of the coating liquid (2), except for using 15 g of sodium hypophosphite instead of the high purity montmorillonite used in the preparation of the coating liquid (2).

Preparation of Coating Liquid (4)

A coating liquid (4) was obtained in the same manner as that in the preparation of the coating liquid (2), except for changing the amount of the high purity montmorillonite used in the preparation of the coating liquid (2) to 17 g.

Example 1

A non-oriented polypropylene sheet of 300 μm in thickness, one side of which had been corona-treated, was used as a support. On the corona-treated surface of the support was gravure-coated an anchor coating agent (EL510-1/CAT-RT87=5/1 (weight ratio), produced by Toyo-Morton, Ltd.) at a coating rate of 3 m/min and a drying temperature of 80° C. by a microgravure coating method using a test coater (manufactured by Yasui Seiki) to form an anchor coat layer. The thickness after drying of the anchor coat layer was 0.05 μm.

Then, the above-mentioned coating liquid (1) was gravure-coated at a coating rate of 3 m/min by a microgravure coating method (the number of lines on a gravure roll was 150, #: GM) using a test coater (manufactured by Yasui Seiki), and then was dried at 100° C. This operation was repeated five times to give a layered article in which a coating film layer was laminated on the support. The thickness of the coating film layer was 2.0 μm and the Na concentration in the coating film layer was 7,000 ppm. The resulting layered article was thermoformed by the aforementioned method. Then, the shaped layered article was subjected to evaluation. The result is shown in Table 1.

Comparative Example 1

A support having an anchor coat layer was obtained in the same manner as Example 1 except for failing to use the coating liquid (1) in Example 1. The resulting support was thermoformed by the aforementioned method, and then it was evaluated. The result is shown in Table 1.

Example 2

A non-oriented homopolypropylene sheet of 100 μm in thickness, one side of which had been corona-treated, and a non-oriented random polypropylene sheet of 300 μm in thickness, one side of which had been corona-treated, were laminated on their corona-treated surfaces by dry lamination. The homopolypropylene sheet was then subjected to corona treatment, followed by the application of an anchor coating agent in the same manner as that in Example 1, resulting in the formation of an anchor coat layer. The thickness after drying of the anchor coat layer was 0.05 μm.

Then, the above-mentioned coating liquid (3) was gravure-coated at a coating rate of 3 m/min by a microgravure coating method (the number of lines on a gravure roll was 150, #: GM) using a test coater (manufactured by Yasui Seiki), and then was dried at 100° C. This operation was repeated four times, so that a second coating film was laminated on the anchor coat layer. Moreover, the coating liquid (2) was coated once on the second coating film by the same method as that described above and then was dried at 100° C., resulting in the formation of a first coating film and giving a layered article. The thickness of the second coating film was 1.6 μm and the thickness of the first coating film was 0.4 μm. The Na concentrations in the first coating film and the first coating film were each 7,000 ppm. The resulting layered article was thermoformed by the aforementioned method. Then, the shaped layered article was subjected to evaluation.
The results are shown in Table 2.

Comparative Example 2

A layered article was obtained in the same manner as that in Example 2, except for forming a coating film containing an inorganic laminar compound by the use of the coating liquid (2) instead of the coating liquid (3) and forming a coating film containing no inorganic laminar compound by the use the coating liquid (3) instead of the coating liquid (2). The thickness of the coating film containing the inorganic laminar compound was 0.4 μm and the thickness of the coating film containing no inorganic laminar compound was 1.6 μm. The Na concentrations in the coating film containing the inorganic laminar compound and in the coating film containing no inorganic laminar compound were each 7,000 ppm. The resulting layered article was thermoformed by the aforementioned method. Then, the shaped layered article was subjected to evaluation. The results are shown in Table 2.

Comparative Example 3

A support having an anchor coat layer was obtained in the same manner as Example 2 except for using neither the coating liquid (2) nor the coating liquid (3) in Example 2. The resulting support was thermoformed by the aforementioned method, and then it was evaluated. The results are shown in Table 2.

TABLE 1

|  | Example 1 | Comparative Example 1 |
|---|---|---|
| Coating film (on AC layer) |  |  |
| Na concentration (ppm) | 7000 | — |
| OH groups:COOH groups (molar ratio) in polymer component | 86:14 | — |
| Amount (% by weight) of OH groups and COOH groups in polymer component | 43.4 | — |
| Layered article |  |  |
| Shapability | ○ | ○ |
| Pencil hardness | F | 2B |

TABLE 2

|  | Example 2 | Comparative Example 2 | Comparative Example 3 |
|---|---|---|---|
| First coating film (on AC layer) |  |  |  |
| Na concentration (ppm) | 7000 | 7000 | — |
| OH groups:COOH groups (molar ratio) in polymer component | 86:14 | 86:14 | — |
| Polymer component/inorganic laminar compound (volume ratio) | 100/0 | 80/20 | — |
| Thickness (μm) | 1.6 | 0.4 | — |
| Second coating film |  |  |  |
| Na concentration (ppm) | 7000 | 7000 | — |
| OH groups:COOH groups (molar ratio) in polymer component | 86:14 | 86:14 | — |
| Polymer component/inorganic laminar compound (volume ratio) | 80/20 | 100/0 | — |
| Thickness (μm) | 0.4 | 1.6 | — |
| Layered article |  |  |  |
| Shapability | ○ | x | ○ |
| Pencil hardness | F | B | 2B |

INDUSTRIAL APPLICABILITY

According to the method of the present invention, multilayer articles having good scratch resistance can be produced efficiently.

The invention claimed is:
1. A method for producing a multilayer article; comprising:
a step of applying a first dispersion liquid comprising a first liquid medium and a first polymer component, a first alkali metal ion and a first inorganic laminar compound each dispersed in the first liquid medium to a surface of a support having a layer composed of a first thermoplastic resin to form a first dispersion liquid film on the support, wherein the first polymer component contains hydroxyl groups and carboxyl groups at a molar ratio, hydroxyl groups:carboxyl groups, of from 30:70 to 95:5;

a step of removing the first liquid medium from the first dispersion liquid film to form a first coating film, thereby producing a layered article comprising the support and the first coating film;

a step of heating the layered article at or above a temperature at which a condensation reaction between a hydroxyl group and a carboxyl group in the first coating film can occur, thereby making the hydroxyl groups and the carboxyl groups of the first polymer component react together to harden the coating film; and a step of supplying a second thermoplastic resin having been plasticized onto the layer composed of the first thermoplastic layer of the substrate of the layered article and shaping it into a specified shape, thereby producing a multilayer article having the layered article and a layer of the second thermoplastic resin.

2. The method according to claim 1, wherein the support is a multilayer support comprising the layer composed of the first thermoplastic resin and a second coating film formed on one side of the layer composed of the first thermoplastic resin, and wherein the method further comprises a step of preparing the multilayer support, this step comprising:

a step of applying a second dispersion liquid comprising a second liquid medium, a second polymer component and a second alkali metal ion each dispersed in the second liquid medium to a surface of the layer composed of the first thermoplastic resin to form a second dispersion liquid film on the layer composed of the first thermoplastic resin, and a step of removing the second liquid medium from the second dispersion liquid film to form a second coating film, thereby producing the multilayer support.

3. The method according to claim 2, wherein the thickness of the first coating film is adjusted to not greater than the thickness of the second coating film.

4. The method according to claim 2, wherein the second dispersion liquid further comprises a second inorganic laminar compound, and the ratio of the volume of the first inorganic laminar compound to the total volume of the first polymer component and the first inorganic laminar compound to be added to the first liquid medium in the preparation of the first dispersion liquid is adjusted to be greater than the ratio of the volume of the second inorganic laminar compound to the total volume of the second polymer component and the second inorganic laminar compound to be added to the second liquid medium in the preparation of the second dispersion liquid.

5. The method according to claim 1, wherein the first polymer component comprises a polymer component (A2) having hydroxyl groups but having no carboxyl groups and a polymer component (A3) having carboxyl groups but having no hydroxyl groups.

6. The method according to claim 5, wherein is a mixture in which the weight ratio of the polymer component (A2) to the polymer component (A3) is from 5/95 to 50/50.

7. The method according to claim 5, wherein the polymer component (A2) is a polyvinyl alcohol-based polymer.

8. The method according to claim 5, wherein the polymer component (A2) comprises a polyvinyl alcohol-based polymer and a compound (E) having in the molecule two or more continuous carbon atoms each having at least one hydroxyl group attached thereto.

9. The method according to claim 8, wherein the component (E) is at least one compound selected from among monoglycerol and polyglycerols.

10. The method according to claim 7, wherein the polyvinyl alcohol-based polymer has a polymerization degree of from 1,000 to 2,000.

11. The method according to claim 5, wherein the polymer component (A3) is a polyacrylic acid-based polymer.

12. The method according to claim 5, wherein the polymer component (A3) comprises a polyacrylic acid-based polymer and a compound (F) having in the molecule two or more continuous carbon atoms each having at least one carboxyl group attached thereto.

13. The method according to claim 11, wherein the polyacrylic acid-based polymer has a weight average molecular weight of from 500,000 to 5,000,000.

14. The method according to claim 1, wherein the amount of the first alkali metal ion contained in the first dispersion liquid is from 0.2% to 5% of the weight of the first polymer resin.

15. The method according to claim 1, wherein an inorganic laminar compound having the first alkali metal ion between layers is used as the first inorganic laminar compound.

16. The method according to claim 1, wherein the first thermoplastic resin of the support is a crystalline thermoplastic resin having a melting point and in the step of heating a layered article the temperature of the layered article is held at 100 to 180° C. for 1 to 60 seconds, and wherein the method further comprises a step of shaping the layered article into a specified shape when the temperature of the layered article is within a range of from (the melting point of the crystalline thermoplastic resin−30° C.) to (the melting point of the crystalline thermoplastic resin+30° C.).

17. The method according to claim 1, wherein the first thermoplastic resin of the support is a non-crystalline thermoplastic resin having a glass transition point and in the step of heating a layered article the temperature of the layered article is held at 100 to 180° C. for 1 to 60 seconds, and wherein the method further comprises a step of shaping the layered article into a specified shape when the temperature of the layered article is within a range of from (the glass transition point of the non-crystalline thermoplastic resin−30° C.) to (the glass transition point of the non-crystalline thermoplastic resin+30° C.).

18. The method according to claim 16 or 17, wherein the step of shaping a layered article is a step of vacuum sucking the layered article to bring it into contact with a three-dimensionally contoured molding surface of a mold or a step of blowing compressed air to the layered article to bring the layered article into contact with a three-dimensionally contoured molding surface of a mold.

* * * * *